(12) United States Patent
Van Dijk et al.

(10) Patent No.: US 7,241,484 B2
(45) Date of Patent: Jul. 10, 2007

(54) REINFORCED PROFILE

(75) Inventors: Dirk Van Dijk, Beneden (GB); Johan Albert Schoenmaker, Holten (NL)

(73) Assignee: Tech-Wood International Ltd., St. Peter Port (GB)

( * ) Notice: Subject to any disclaimer, the term of this patent is extended or adjusted under 35 U.S.C. 154(b) by 0 days.

(21) Appl. No.: 10/801,989

(22) Filed: Mar. 16, 2004

(65) Prior Publication Data

US 2004/0219357 A1   Nov. 4, 2004

Related U.S. Application Data

(60) Provisional application No. 60/459,167, filed on Mar. 31, 2003.

(30) Foreign Application Priority Data

Mar. 17, 2003   (NL) .................................. 1022946

(51) Int. Cl.
| C08K 7/00 | (2006.01) |
| B32B 27/04 | (2006.01) |
| B32B 1/00 | (2006.01) |
| E04C 3/30 | (2006.01) |

(52) U.S. Cl. ..................... 428/114; 428/105; 52/720.1; 52/729.1; 264/171.13; 264/171.24; 264/171.28

(58) Field of Classification Search ................ 428/587, 428/206, 114, 105, 106; 260/897 C; 52/729.1, 52/731.2, 309.7, 309.16; 264/171.13, 171.14, 264/171.15, 171.23, 171.24, 171.26, 171.28, 264/177.1, 211

See application file for complete search history.

(56) References Cited

U.S. PATENT DOCUMENTS

| 3,308,507 | A |  | 3/1967 | Black |
| 3,770,859 | A |  | 11/1973 | Bevan |
| 3,856,891 | A | * | 12/1974 | West et al. .................. 525/192 |
| 4,097,422 | A | * | 6/1978 | Markusch .................... 521/154 |
| 4,192,839 | A |  | 3/1980 | Hayashi et al. |
| 4,221,621 | A |  | 9/1980 | Seki et al. |
| 4,559,262 | A |  | 12/1985 | Cogswell et al. |
| 5,082,605 | A |  | 1/1992 | Brooks et al. |

(Continued)

FOREIGN PATENT DOCUMENTS

CA   907491   8/1972

(Continued)

OTHER PUBLICATIONS

KOSA, The Dictionary of Fiber and Textile Technology, pp. 15, 83, 96, 106, and 176.

*Primary Examiner*—N. Edwards
(74) *Attorney, Agent, or Firm*—Smith, Gambrell & Russell, LLP

(57) ABSTRACT

A method for manufacturing a compound construction element, in an extrusion process wherein a composite material is pressed through an extrusion die, which composite material includes a matrix of thermoplastic synthetic material including wood particles or other, cellulose containing particles in a content on the order of 50% by weight or more, wherein also one or more elongated additional elements are passed through the extrusion die, which additional elements are brought into tight engagement with the composite material, after which the compound element is shaped and preferably cooled in a die.

33 Claims, 3 Drawing Sheets

U.S. PATENT DOCUMENTS

| | | | |
|---|---|---|---|
| 5,096,406 A | 3/1992 | Brooks et al. | |
| 5,234,652 A | 8/1993 | Woodhams | |
| 5,273,819 A | 12/1993 | Jex | |
| 5,401,154 A | 3/1995 | Sargent | |
| 5,474,722 A | 12/1995 | Woodhams | |
| 5,516,472 A | 5/1996 | Laver | |
| 5,827,462 A | 10/1998 | Brandt et al. | |
| 5,836,128 A | 11/1998 | Groh et al. | |
| 5,866,051 A | 2/1999 | Lin et al. | |
| 5,882,564 A | 3/1999 | Puppin | |
| 6,011,091 A | 1/2000 | Zehner | |
| 6,035,588 A | 3/2000 | Zehner et al. | |
| 6,103,791 A | 8/2000 | Zehner | |
| 6,117,924 A | 9/2000 | Brandt | |
| 6,131,355 A | 10/2000 | Groh et al. | |
| 6,189,269 B1 * | 2/2001 | De Zen | 52/220.5 |
| 6,248,813 B1 | 6/2001 | Zehner | |
| 6,272,808 B1 | 8/2001 | Groh et al. | |
| D448,865 S | 10/2001 | Manning | |
| 6,295,778 B1 | 10/2001 | Burt | |
| D450,138 S | 11/2001 | Barber | |
| 6,321,500 B1 | 11/2001 | Manning et al. | |
| 6,322,731 B1 | 11/2001 | Pagden | |
| 6,337,138 B1 | 1/2002 | Zehner et al. | |
| 6,341,458 B1 | 1/2002 | Burt | |
| 6,344,504 B1 | 2/2002 | Zehner et al. | |
| 6,345,479 B1 | 2/2002 | Hutchinson et al. | |
| 6,358,585 B1 | 3/2002 | Wolff | |
| 6,360,508 B1 | 3/2002 | Pelfrey et al. | |
| 6,393,785 B1 | 5/2002 | Burt | |
| 6,409,952 B1 | 6/2002 | Hacker et al. | |
| 6,423,257 B1 | 7/2002 | Stobart et al. | |
| 6,453,630 B1 | 9/2002 | Buhrts et al. | |
| 6,464,913 B1 | 10/2002 | Korney, Jr. | |
| 6,488,150 B1 | 12/2002 | Gordon et al. | |
| 6,498,205 B1 | 12/2002 | Zehner | |
| 6,502,357 B1 | 1/2003 | Stuthman | |
| 6,511,757 B1 | 1/2003 | Brandt et al. | |
| 6,516,577 B2 | 2/2003 | Pelfrey et al. | |
| D471,292 S | 3/2003 | Barber | |
| 6,658,808 B1 | 12/2003 | Doherty | |
| 6,929,841 B1 * | 8/2005 | Van Dijk et al. | 428/114 |
| 2001/0019749 A1 | 9/2001 | Godavarti et al. | |
| 2002/059766 A1 | 5/2002 | Gregori | |
| 2002/0192431 A1 | 12/2002 | Edgman | |

FOREIGN PATENT DOCUMENTS

| | | |
|---|---|---|
| DE | 28 11 795 | 10/1978 |
| EP | 0 008 143 | 2/1980 |
| EP | 0 319 589 | 6/1989 |
| EP | 0 591 801 | 4/1994 |
| EP | 0 820 848 A1 | 1/1998 |
| EP | 1 172 404 A1 | 1/2002 |
| JP | 59217743 | 12/1984 |
| JP | 60069161 | 4/1985 |
| JP | 2098429 | 10/1990 |
| JP | 6279615 | 10/1994 |
| NL | 9302125 | 7/1995 |
| NL | 9400308 | 7/1995 |
| SU | 1100288 | 6/1984 |
| WO | WO 96/34045 | 10/1996 |

* cited by examiner

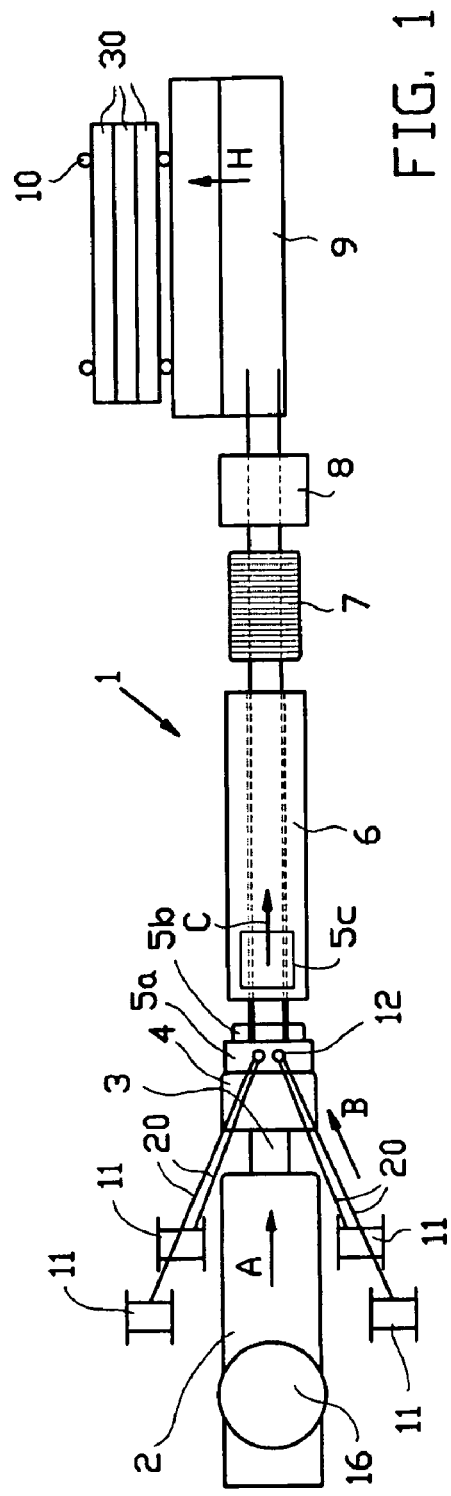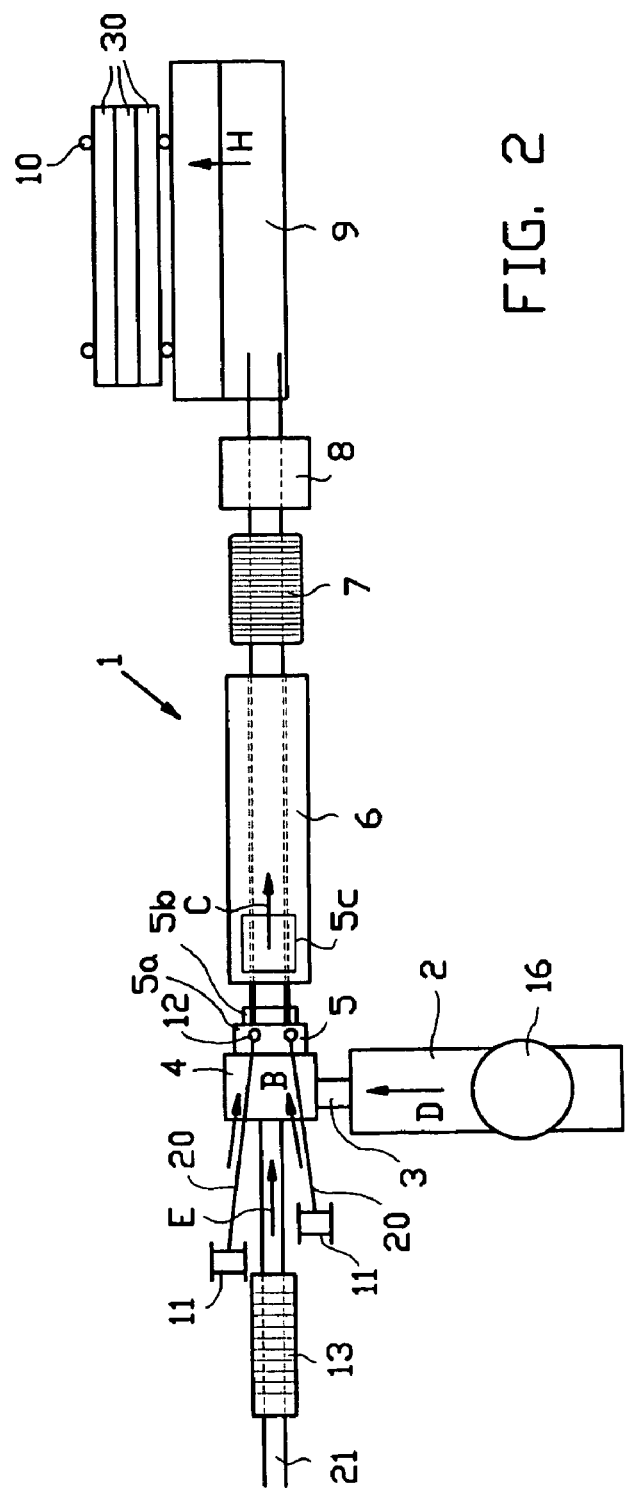

REINFORCED PROFILE

CROSS-REFERENCE TO RELATED APPLICATION

This application claims the benefit of U.S. Provisional Application No. 60/459,167, filed Mar. 31, 2003, which is relied on and incorporated by reference.

FIELD OF THE INVENTION

The invention relates to a method for manufacturing reinforced profiles or sections, such as beams.

The invention particularly relates to such profiles for use at locations where they are visible and can be seen.

PRIOR ART

Reinforced profiles are widely known, for instance in the form of reinforced concrete beams. They are placed at locations where the forces from structures that are situated above them, for instance roofs, have to be absorbed and transferred to structures that are situated below them, such as columns. Such reinforced profiles serve as an alternative to steel beams or wooden joists.

A drawback of such beams or profiles is that at locations where they can be seen, a covering or cladding has to be provided when the said space is not a storage or factory or production facility in order to avoid an unattractive appearance.

SUMMARY OF THE INVENTION

It is an object of the invention to improve on this, by offering an alternative.

It is a further object of the invention to provide a profile and a method of manufacture thereof that is an attractive alternative to existing force transferring profiles in structures of various nature, large or small.

A further object of the invention is to provide a compound profile wherein elements are included that fulfil an additional function with respect to the main material of the profile.

In one aspect, the invention provides a method for manufacture of a compound construction element by an extrusion process, wherein a composite material is pressed through an extrusion die, which composite material comprises a matrix of thermoplastic synthetic polymer material including wood particles or other, cellulose-containing particles in a content in the order of 50% by weight or more, preferably 50–80% by weight, more preferably approximately 70–80% by weight, wherein also one or more elongated additional elements are passed through the extrusion die, which additional elements are brought into tight engagement with the composite material, after which the compound element is shaped in a die.

In such a combined process a profile is obtained that has a wood-like appearance, and thus is suitable for placing in locations where they are visible and wherein the elongated, additional elements may provide an extra function to the profile. This for instance particularly, but not exclusively, regards reinforcement elements. Moreover the profile of this invention, despite its strength may be nailable and/or screwable, as a result of which many structural or construction possibilities become feasible, which would not have been possible in the case of on the one hand concrete or steel elements and on the other hand in the case of entirely wooden elements. This for instance regards the use of reinforced profiles as supporting framework on which a floor or terrace is mounted by means of nails or screws.

Preferably use is being made of an extrusion process with subsequent cooling in a die attached to an extruder. Such process is also known as a pushtrusion process. Preferably, a further cooling takes place in a cooling tank, placed at a distance downstream of said shaping die. A calibration die may be placed immersed in coolant in the cooling tank.

The additional elements are added without interruption of the extrusion, in particular pushtrusion process, wherein hardly any preparational work is necessary, as would be the case when producing reinforced concrete beams and the like.

The wood particles or other, cellulose-containing particles in the thermoplastic synthetic material increase the E-modulus of said material considerably (various times higher, approximately 4–5 times to 4–8 times higher than standard polyethylene or polypropylene), as a result of which the interaction with reinforcement elements is enhanced. As a result of the high content of wood particles or other, cellulose-containing particles, etcetera, a high E-modulus of the composite material after cooling is obtainable, of more than approximately 6000 MPa (870,000 psi), in a preferred embodiment approximately 6000–12000 MPa (870,000–1,740,000 psi), in a further preferred embodiment even approximately 7000–9000 MPa (1,015,000–1,305,000 psi). Thus it can be achieved that the reinforcement elements—considered in transverse direction to it—are kept in place by bending the construction element used. As a result the moment of inertia of the construction element is preserved. In a thermoplastic material that is not provided with such a fraction of wood particles or other, cellulose-containing particles the reinforcement elements would be able to migrate in transverse direction when bent and thus get closer to the neutral line. This could cause elastic instability ('buckling').

When the wood particles or other, cellulose-containing particles when added in the thermoplastic synthetic material have a moisture content of lower than approximately several % by weight, preferably lower than approximately 1% by weight, moisture will be absorbed by said particles after the manufacturing process is finished and in later conditions of use (open air). Due to this moisture absorption these particles will expand, which however is at least partially prevented by the reinforcement elements present, as a result of which inherent compression stress in the matrix of the composite material is generated. This results in an increase of the bending strength of the construction element. Due to the high content of wood particles or other, cellulose-containing particles in the thermoplastic matrix a pre-stressed situation will continue to exist and not disappear due to creep.

The increased stiffness of the matrix of the composite material makes it possible to make profiles with multiple hollow sections, particularly having relatively thin walls. The high stiffness leads to higher elastic stability of the partitions between the multiple cavities that are loaded at pressure and shearing.

The manufacturing process of the invention may take place in a simple and space-efficient manner when the reinforcement elements, when supplied, are bendable in the longitudinal direction.

In one embodiment of the invention, reinforcement elements having a substantially round cross-section are customarily used.

In an alternative or additional embodiment use is made of reinforcement elements having an non-round cross-section, such as flat or strip-shaped elements.

Depending on the intended use, the additional elements may be made of metal, synthetic material, natural fibres, yarn or glass/carbon fibres. The term "synthetic material" is intended to include thermoplastic synthetic polymers.

In a further embodiment use can be made of additional elements which, in their longitudinal direction, are rigid and/or buckle/bend rigid, and in this way the compression strength of the compound element is increased. When the additional elements are profile-shaped, particularly tubular or U-profile-shaped, the rigidity against bending can be increased in several directions.

For a desirable appearance the rigid additional element is made of wood, and thus is better adapted to the location of use when the profile is visible.

For enhancing the strength and rigidity of the composite synthetic material it is preferred that wood particles or other, cellulose-containing particles in fibre form are used. The fibres preferably comprise a fraction of longer fibres, wherein said longer fibres are substantially oriented in the extrusion direction. As a result the bending and tensile strength is increased and the wood-like appearance of the material is enhanced.

The thermoplastic synthetic material preferably is a polyolefin, such as polyethylene or polypropylene, or a PVC, or a polycarbonate.

The E-modulus of the composite material (matrix) is further increased when the content of wood particles or other, cellulose-containing particles is more than approximately 50–80% by weight, preferably 70–80% by weight.

Preferably the additional elements are entirely enveloped or encapsulated by the composite material, so that the cooperation between the compound parts can be optimal.

The invention furthermore provides an elongated construction element built up from a composite material of a thermoplastic synthetic material and a mass on the order of 50% by weight or more, preferably between 50–80% by weight, more preferably approximately 70–80% by weight of wood particles or other, cellulose containing particles, as well as embedded longitudinal reinforcement elements.

Preferably the E-modulus is more than approximately 6000 Mpa (870,000 psi), in a more preferred embodiment even 6000–12000 MPa, (870,000–1,740,000 psi) and in a most preferred embodiment approximately 7000–9000 Mpa (1,015,000–1,305,000 psi).

The elongated, compound construction element may have the shape of an I-profile, H-profile or another profile comprising a body and legs or arms that are protruding therefrom.

Alternatively the compound construction element may have the shape of a tubular profile or hollow profile, preferably having multiple cavities or hollow sections.

BRIEF DESCRIPTION OF THE DRAWINGS

The invention will be illustrated on the basis of an exemplary embodiment shown in the attached drawings, in which, FIG. 1 shows a schematic view of a set-up of an installation for carrying out a first embodiment and a method according to the invention;

FIG. 2 shows a schematic view of a set-up for carrying out a second embodiment of a method according to the invention;

DETAILED DESCRIPTION OF EMBODIMENTS

Figure 3:
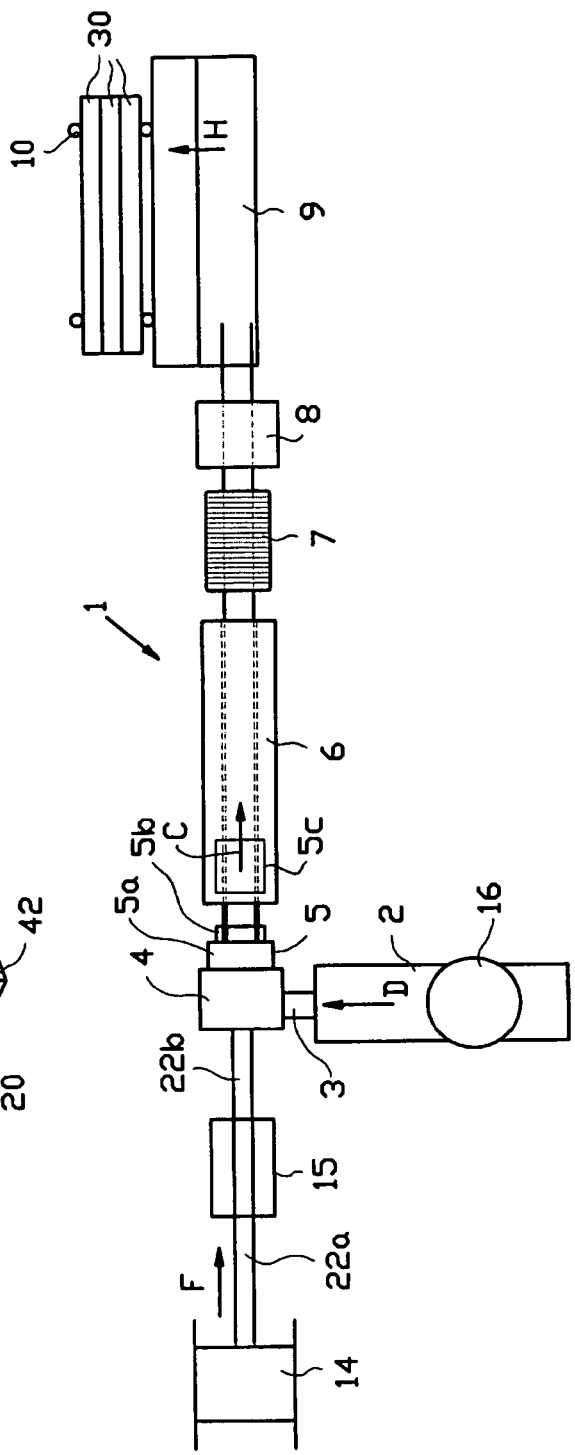
FIG. 3 shows a schematic view of a set-up for carrying out a third embodiment of a method according to the invention.
Figure 5:
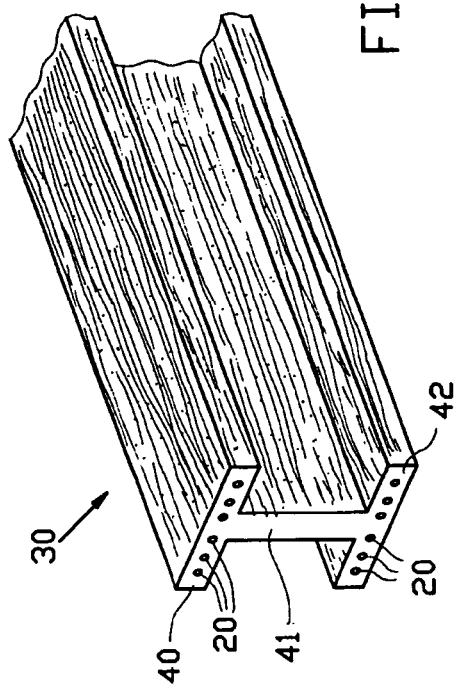
FIG. 5 shows a perspective view of the profile of FIG. 4A.

The set-up shown in FIG. 1 comprises an installation 1 comprising a pushtruder 2 having a feed 16, which via intermediate flange 3 merges into extrusion die 4. A fibre-orientating device is incorporated in the extrusion die 4. Downstream of the extrusion die 4, immediately contiguous to it, a shaping unit 5 is placed, wherein cooling facilities have also been incorporated. The shaping unit 5 comprises a pre-shaping die 5a, in which the profile is substantially shaped, and a cooling/shaping die 5b attached to the die 5a, in which the shape is further established. Downstream of the shaping unit 5 a post-cooling unit or tank 6 is positioned, in which optionally a further cooling/calibrating die 5c may be positioned, immersed in the coolant in the cooling unit or tank 6, at the upstream end thereof. Furthermore a tension control unit 7 is positioned, and downstream thereof there is a sawing unit 8. Downstream thereof a discharge table 9 is positioned, from where cut to length elements 30 can be discharged in sideward direction H to a container 10 for discharging transport and storage.

Adjacent to the pushtruder 2 a number of reels 11 are positioned, on which reinforcement cables 20 are wound. The reels 11 may be driven by means that are not shown, to discharge the cables 20 in the direction B. In the pre-shaping die 5a passages 12 for the cables 20 are located, which passages 12 guide cables 20 through to the passage in the die 5b for the mass from the pushtruder 2.

In the pushtruder 2, via feed 16, a composite of a thermoplastic synthetic material, like a polyolefine, in particular polyethylene or polypropylene, or a PVC or polycarbonate, is plasticized by pressure and heating in the screw conveyer with a wood fibre component, in a content of 50% by weight or more, in particular 70–80% by weight is mixed. The fraction of wood particles or other, cellulose-containing particles is dried and contains approximately less than 1% by weight of moisture and may advantageously be composed of a portion of small fibres, particularly of 0.2–2 mm and a fraction of large elongated particles, such as fibres having a length in the range of 2–6 mm. The average size of the small fibres is smaller than the average size of the large fibres. Such fibres are the subject matter of International patent application PCT/NL95/00153, the contents of which are relied on and incorporated herein by reference.

After some plasticizing mixing and during transport in the direction A, for instance using a screw conveyor (not shown), and passage through the flange 3, the mass thus mixed to some extent, arrives under pressure in the extrusion die 4, where by means of the orientation means the long fibres are oriented in process/extrusion direction. The oriented mass arrives in the die 5a, where via the passage 12 the reinforcement elements or cables 20—that are kept in position or taut—are added to the extruded mass at positions in transverse cross-section of the product that are desirable for the subsequent reinforcement function.

The extruded mass with the reinforcement cables 20 introduced into it enters the cooling/shaping die 5b under pressure, where the combined mass while being cooled is kept in the desired shape and is solidified, with the cables at the desired place. The shaped profile exits in the direction C and then arrives in the after-cooling unit 6, optionally first passing through the after-cooling/calibrating die 5c. By means of tension control unit 7 unwanted longitudinal tensions in the shaped profile are counteracted in the unit 6.

After cooling/calibrating, when the compound profile is solid in the correct shape, it is transported further by means of tension control unit 7, in order to be cut through at the right length at the location of sawing station 8. As already indicated before, the collection in a container 10 then follows.

Figure 4A:
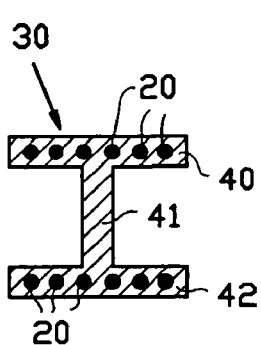
FIGS. 4A–4H show some cross-sections of profiles manufactured using a method according to the invention.

In this way profiles 30, can be manufactured at the desired length having a cross-section such as for instance indicated in FIG. 4A. This figure shows an I-profile or I-beam 30, having an upper flange 40, a web 41 and a lower flange 42. In the upper flange 40 and the lower flange 42 reinforcement wires or reinforcement cables 20 have been included. The reinforcement cables 20 may be intended for providing a tensile reinforcement, or for providing a compressive reinforcement. They may be round in particular, and profiled or textured, or provided with protrusions. The cables 20 may consist of some wires, twined wires, or wires that have been twisted into each other. The material used for the wire may be (stainless) steel wire or twined steel cable, or for instance synthetic polymer material, for instance as synthetic yarn, having a high tensile strength and a low rupture strain. Composite material may also be used, for instance twined carbon fibres or glass fibres in a synthetic matrix. Natural yarns or twined fibres such as hemp, sisal, etcetera, may also be used.

A good joining (adhesion) between the matrix and the reinforcement elements may in principle be achieved in two ways (or a combination thereof). First of all the surface of the reinforcement elements can have such a morphology that a technical anchoring of the matrix to the reinforcement elements occurs. This may for instance be realised by means of having a roughness or ribbed structure in the surface. Another option can be to use a strong twine as the reinforcement element consisting of several components. A second option for achieving the adhesion is where the surface of the reinforcement elements causes a chemical connection with the matrix (sizing). This can be done by beforehand applying a thin layer of modified polymer on the reinforcement elements. The polymer has to interact with the polymer in the matrix and due to its modification interact with the surface of the reinforcement elements. Such polymers are well known in the art for sizing. They are for example, polypropylene comprising functional groups for chemically or physically binding to both the surface of the reinforcement elements as well as the matrix. In most cases, it therefore has one or more types of functional groups built into the polymer.

Figure 4B:
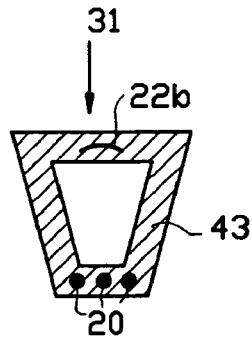
Figure 4C:
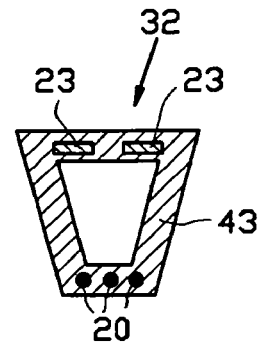

As shown in FIGS. 4B and 4C, instead of several cables 20 another form of reinforcement can be opted for, particularly in a pressure zone of the profile to be manufactured. In the FIGS. 4B and 4C a trapeziodal-shaped tubular profile 31, 32 is shown, having a circumferential wall, having reinforcement cables 20 in the lower part, and in the upper part a bent steel reinforcement strip 22 (31) and two reinforcement strips or narrow plates 23 (32), respectively.

Figure 4D:
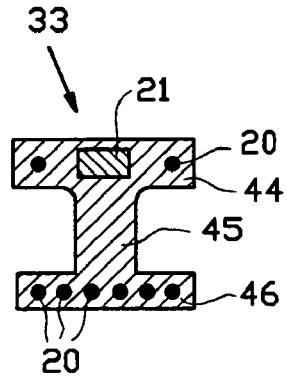
Figure 4E:
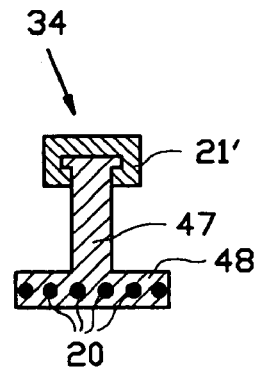
Figure 4F:
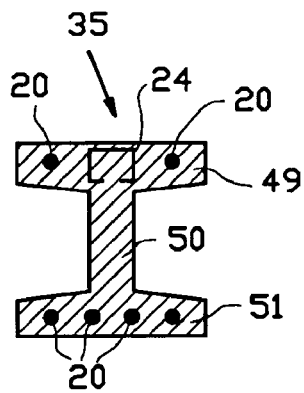
Figure 4G:
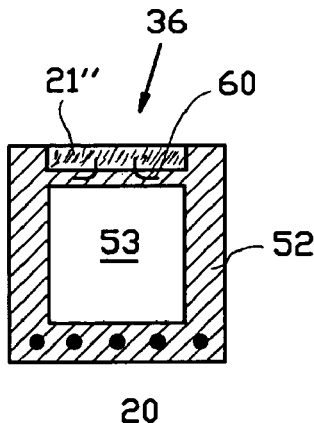
Figure 4H:
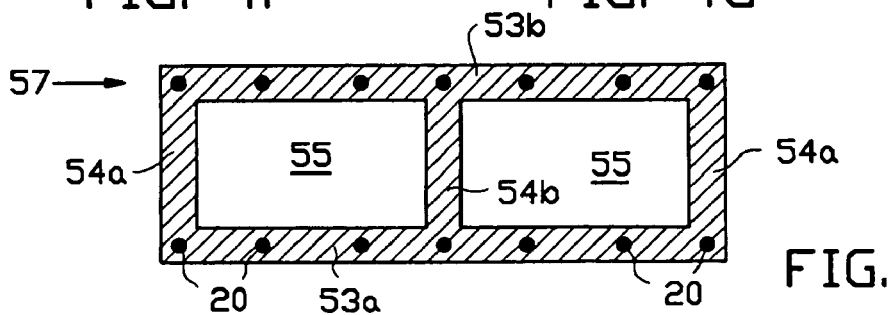

In FIG. 4H a multiple tubular profile 37 is shown, having a bottom wall 53a, an upper wall 53b, side walls 54a and partition 53b, defining cavities 55, and reinforcement wires or reinforcement cables 20 included in the bottom wall and the upper wall. Said cables 20 allow screwing or nailing and are placed such that they strongly enhance the bending stiffness. The element 37 can be used as girder.

For supplying the strip 22b, 23a supply roll can be positioned near the pushtruder in a position vertically in line with the passage into the extrusion die 4, from which roll the strip is unwound and supplied to the extrusion die. In case of the bent strip profile 22b a transformation unit can be placed in between, for converting the flat (such as wound) shape (22a) to the bent shape according to 22b. The material for the strip 22b, 23 may be metal (e.g. Steel), or for instance synthetic fibre material, such as glass fibre, carbon fibre or aramid fibre, reinforced synthetic profiles.

In FIG. 3 an example of such a set-up is shown, in this case without a supply of cables 20, wherein the strip is wound over roll 14, is discharged in flat shape in the direction F as strip 22a, is subsequently converted via transformer 15 into a bent strip 22b, which is passed through the extrusion die 4, and via the dies 5a,b exits in the direction C. In this embodiment, the pushtruder 2 is placed transverse sideward, for discharging material in the direction D, via flange 3, into the extrusion die 4, and is provided with orientation means oriented in the direction C. The compound material, including the said strip 22b, exits in direction C. Then the process as described in connection with FIG. 1 follows.

In FIG. 2 a set-up is shown in which via pressure bench 13 a more or less rigid profile 21 for instance of wood, is supplied in the direction E, to the extrusion die 4 while under pressure of the pressure bench 13. The extrusion die 4 is fed from the side in the direction D with a flow of composite mass, such as thermoplastic synthetic material-/wood particles or the like, as described above, which flow is turned through 90° and is oriented. Optionally cables 20 are supplied from reels 11 in the direction B, via holes 12 in the pre-shaping die head 5a. The whole combination is discharged under pressure in the direction C, to a post-cooling unit 6 as mentioned above. The profile 21 is preferably discharged at a location where it ends up in a pressure zone of the profile to be manufactured, e.g. in die 4. The profile 21 may be made of wood, of steel/aluminium, or for instance of glass or carbon reinforced synthetic material.

Examples of compound profiles manufactured with such rigid profiles are shown in FIGS. 4F and 4G.

The I-girder/beam 35 of FIG. 4F comprises an upper flange 49, a body 50 and a lower flange 51. In the lower flange 51 reinforcement cables 20 have been included, and in the upper flange 49 two reinforcement cables 20, and in between a substantially inverted U-shaped profile 24 made of steel.

The tubular profile 36 shown in FIG. 4G in its lower wall has reinforcement cables 20, is free from reinforcement in the side walls 52, and the upper wall is formed with a recess, in which a wooden board 21 is incorporated, which is anchored with anchors 60 in the wood/synthetic composite material that defines the walls. The anchors 60 may be arranged in the wood material 21" beforehand, optionally evenly spaced apart from each other.

It is observed that for enhanced connection between wood/synthetic composite material and the board or strip-shaped additional elements that may or may not be rigid, instead of (or in addition to) anchors, the strip material may be provided with a profiled/textured surface, for instance in the form of milled recesses, and/or may be provided with holes. Said holes can be filled with the composite material. The holes may be conical, which is advantageous in case the strip or the board will be situated at the outer side of the profile to be made, wherein the conicity is such that the hole is widest at the outer surface of the profile.

Due to the supply being substantially in line with the discharge in the direction C oriented from the die head 5, of elongated elements such as 21 and 22a,b that may in particular be pressure/buckle rigid, it is possible that elongated elements of any given cross-sectional shape can be combined with the composite material from the pushtruder 2. Placing the pushtruder 2 at an angle to the direction C is no objection here.

Examples of possible compound profiles that may result from that are shown in FIGS. 4D and 4E In FIG. 4D again an I-beam 33 is shown, having an upper flange 44, body 45 and lower flange 46. In the lower flange 46 reinforcement cables 20 have been included and in the upper flange 44 on either side reinforcement cables 20 and in between them a wooden board 21. In FIG. 4E an inverted T-profile 34 is shown, having a body 47 and a lower flange 48, in which reinforcement cables 20 have been included. The upper edge of the body 47 is provided with short protruding side flanges, around which an accordingly shaped, substantially U-shaped or wooden profile 21' engages.

In connection with facilitating the windability, the wires 20 may have a small diameter, for instance 1 to 4, or even 1 to 2 mm.

It will be understood that there is a wide choice in the selection of suitable elongated elements for incorporation in the composite synthetic/wood fibre material. This depends on the intended function the profile to be made (for instance the function of a lintel). Independent thereof the appearance of the profile can be made to look like wood.

The profile can be painted, nailed and screwed.

In case of tensile reinforcement elements, the reinforcement elements, in this case for instance cables 20, may be discharged in position or taut through the holes 20.

It is to be understood that the above description is included to illustrate the operation of the preferred embodiments and is not meant to limit the scope of the invention. From the above discussion, many variations will be apparent to one skilled in the art that would yet be encompassed by the spirit and scope of the claims appended.

We claim:

1. A method for manufacturing an, elongated, reinforced compound construction element in the shape of a tubular or hollow profile, an I-profile, H-profile or another profile comprising a body and legs or arms that are protruding therefrom having an E-modulus of 6000 Mpa or more, having a wood-like appearance in an extrusion process, comprising pressing a composite material through an extrusion die,
   a) which composite material comprises a matrix of thermoplastic synthetic material selected from the group consisting of polyolefin, PVC and polycarbonate and a mass of dried cellulose particles containing approximately less than 1% by weight of moisture and composed of a portion of small fibers in the size of 0.2 to 2 mm and a fraction of large elongated particles of a size 2 to 6 mm, in an amount of at least 50% by weight, and
   b) one or more continuous longitudinal elongated reinforcement elements, which additional elements are brought into tight engagement with the composite material for providing tensile reinforcement or compressive reinforcement to form an initial compound element, thereafter shaping the initial compound element in a die to form said, elongated, reinforced compound construction element.

2. The method according to claim 1, wherein the compound element is cooled during shaping in the die.

3. The method according to claim 1, wherein the content of wood particles or other, cellulose containing particles is between approximately 50–80% by weight.

4. The method according to claim 1, wherein the content of wood particles or other cellulose containing particles is between approximately 70–80% by weight.

5. The method according to claim 1, wherein the composite material after cooling has an B-modulus of approximately 6000–12000 Mpa.

6. The method according to claim 1, wherein the composite material after cooling has an E-modulus of approximately 7000–9000 MPa.

7. The method according to claim 1, wherein the reinforcement elements when supplied are bendable in longitudinal direction and are kept taut.

8. The method according to claim 7, wherein the reinforcement elements have a substantially round cross-section.

9. The method according to claim 7, wherein the reinforcement elements have a non-round cross-section.

10. The method according to claim 7, wherein the reinforcement elements have a flat or strip-shaped cross section.

11. The method according to claim 7, wherein the reinforcement elements are made of metal.

12. The method according to claim 7, wherein the reinforcement elements are made of steel.

13. The method according to claim 1, wherein the reinforcement elements are made of synthetic material.

14. The method according to claim 1, wherein the reinforcement elements are made of natural and/or synthetic fibres.

15. The method according to claim 14, wherein the reinforcement elements are members selected from the group consisting of sisal, hemp, glass, carbon, aramid and mixtures thereof.

16. The method according to claim 1, wherein the reinforcement elements comprise one or more additional elements which, in the longitudinal direction, are rigid and/or buckle/bend.

17. The method according to claim 1, wherein the reinforcement elements are profile-shaped in transverse cross-section.

18. The method according to claim 16, wherein the reinforcement elements are tubular or u-profile-shaped in transverse cross-section.

19. The method according to claim 16, wherein the reinforcement element is made of wood.

20. The method according to claim 16, wherein cellulose particles are in fibre form.

21. The method according to claim 20, wherein the fibres comprise a fraction of longer fibres, wherein said longer fibres are substantially oriented in the extrusion direction.

22. The method according to claim 1, wherein the thermoplastic synthetic material is selected from the group consisting of polyethylene and polypropylene.

23. The method according to claim 1, wherein the additional elements are entirely enveloped by the composite material.

24. An elongated, reinforced construction element the shape of a tubular or hollow profile, an I-profile, H-profile or another profile comprising a body and legs or arms that are protruding therefrom having an E-modulus of 6000 Mpa or more with a wood-like appearance comprising a composite material of a matrix of thermoplastic synthetic material selected from the group consisting of polyolefin, PVC and polycarbonate, and at least 50% by weight of a mass of dried cellulose particles containing approximately less than 1% by weight of moisture and composed of a portion of small fibers in the size of 0.2 to 2 mm and a fraction of large elongated particles of a size 2 to 6 mm, said composite material containing embedded therein at least one continuous longitudinal reinforcement element which is in tight engagement with said composite material for providing tensile reinforcement or compressive reinforcement.

25. The elongated construction element according to claim 24, wherein said mass is present in an amount of at least 50–80% by weight.

26. The elongated construction element according to claim 24, wherein said mass is present in an amount of at least 70–80% by weight.

27. The elongated construction element according to claim 24, wherein the element has an E-modulus of approximately 6000–12000 Mpa.

28. The elongated construction element according to claim 24, wherein the element has an E-modulus of approximately 7000–9000 Mpa.

29. The elongated construction element according to claim 24, made of nailable or screwable material.

30. The elongated construction element according to claim 24, designed as a tubular profile.

31. The elongated construction element according to claim 24, designed as a multiple tubular profile.

32. The method according to claim 2, wherein cooling takes place in a downstream section of the die.

33. The method according to claim 32, wherein further cooling takes place in a tank spaced downstream of the die.

* * * * *